United States Patent [19]

Calarco et al.

[11] Patent Number: 4,897,803
[45] Date of Patent: Jan. 30, 1990

[54] ADDRESS TOKEN BASED IMAGE MANIPULATION

[75] Inventors: Anthony F. Calarco, Fairport; Lisa M. Yamonaco, East Rochester, both of N.Y.

[73] Assignee: Xerox Corporation, Stamford, Conn.

[21] Appl. No.: 124,123

[22] Filed: Nov. 23, 1987

[51] Int. Cl.⁴ .......................... G06F 15/66
[52] U.S. Cl. ..................... 364/518; 364/521
[58] Field of Search ............ 340/749, 750, 798, 799; 358/903, 280; 364/518, 521, 200 MS File, 900 MS File

[56] References Cited

U.S. PATENT DOCUMENTS

| | | | |
|---|---|---|---|
| 3,911,418 | 10/1975 | Takeda | 340/324 AD |
| 3,925,776 | 12/1975 | Swallow | 340/324 AD |
| 3,944,997 | 3/1976 | Swallow | 340/324 AD |
| 4,103,331 | 7/1978 | Thacker | 364/200 |
| 4,194,221 | 3/1980 | Stoffel | 358/283 |
| 4,255,766 | 3/1981 | Matsuda et al. | 358/257 |
| 4,270,146 | 5/1981 | Adachi | 358/256 |
| 4,275,450 | 6/1981 | Potter | 364/515 |
| 4,302,782 | 11/1981 | Gunning et al. | 358/296 |
| 4,387,435 | 6/1983 | Arai et al. | 358/280 |
| 4,442,544 | 4/1984 | Moreland et al. | 382/53 |
| 4,447,809 | 5/1984 | Kodama et al. | 340/747 |
| 4,575,717 | 3/1986 | Fedele | 340/728 |
| 4,580,158 | 4/1986 | Macheboeuf | 358/22 |
| 4,613,906 | 9/1986 | Tanaka et al. | 358/183 |
| 4,646,250 | 2/1987 | Childress | 364/518 |
| 4,667,248 | 5/1987 | Kanno | 358/280 |
| 4,674,040 | 6/1987 | Barker et al. | 364/300 |
| 4,706,076 | 11/1987 | Racchini | 340/750 |

OTHER PUBLICATIONS

Xerox Disclosure Journal; R. G. Matteson; "Implementation Technique for Magnification, Reduction, and Windowing of Electronic Images", vol. 9, No. 1, Jan.-/Feb., 1984, pp. 73–76.

Xerox Disclosure Journal, B. L. Waal; "Window/Image Cropping"; vol. 7, No. 3, May/June 1982, pp. 197–198.

Xerox Disclosure Journal; G. M. Mehalek; "Automatic Gain Control System for Image Input Module"; vol. 7, No. 1, Jan./Feb. 1982, pp. 55–56.

Xerox Disclosure Journal; R. H. Tuhro; "Image Scaling Using Bit Throw-Away Memory", vol. 5, No. 6, Nov./Dec., 1980, p. 639.

Fundamentals of Digital Copiers, Revision 1, Publication No. FY8-1339-010, Canon, Inc. Oct. 1984.

*Primary Examiner*—David L. Clark
*Assistant Examiner*—Raymond J. Bayerl
*Attorney, Agent, or Firm*—Mark Costello

[57] ABSTRACT

A method and apparatus for processing image information. An address designation or token is applied to each pixel or data byte in a scan line of image data describing its position in the scan line. By providing each data byte of image information with an address token defining its specific position in the scan line, the image information for data byte on the image is specifically located in the final image configuration, without requiring storage of the entire image information for manipulation. Operation on both data and address token is possible for image manipulation routines.

9 Claims, 3 Drawing Sheets

ADDRESS TOKEN BASED IMAGE MANIPULATION

The present invention relates generally to a system for processing digitally stored images by an arrangement for assigning a specific address value to each image data byte.

INCORPORATION BY REFERENCE

The patents and other publication cited herein are incorporated by reference.

BACKGROUND OF THE INVENTION

In processing digitally encoded images, particularly those derived from an image scanning device, it is often desirable to provide editing functionality. Accordingly, for example, in combination with an electronic publishing system, in which it may be desirable to manipulate a digital image for use on a page of text, various editing functions might be applied. An assortment of editing functions are available, including but not limited to scaling and magnification or reduction, blanking, the addition of information, highlighting, etc. These functions are difficult to implement in known scanning devices, or other image manipulation arrangements, because for image manipulation the information must be stored, for example, in a page at a time format for manipulation. Thus, image information is not usually manipulated or subject to editing functions as it is initially scanned from an original into electronic form. This capability, i.e., editing functionality in association with an image scanning device, would significantly enhance speed of information handling, and reduce information storage requirements in a device having such a capability.

A variety of image information is desirably added to original image information. Someties new image information replaces original image information, while at other times it is desirable to merge new image information with the original image information. Thus, for example, it may be desirable to replace a portion of the original image with a time, status or date stamp, or new image information obtained from another source. Alternatively, merging image information may be desirable for example, when a portion of the image is desirably highlighted with a darkened or lightened background.

In combination with the addition of new image information, and, in cases without the addition of new image information, it is often desirable to vary or edit the original image to change position of certain portions of the image, to reverse the image appearance dark for light, to mirror the image etc.

US-A 4,255,766 to Matsuda et al. suggest the desirability of the addition of time or date information to stored fascimile images. In performing the addition of the information, the Matsuda et al device counts pixels and scan lines, to determine position. When a selected position, as determined by the counted pixels and scan lines is reached, the stored information is superposed onto the information.

US-A 4,270,146 to Adachi suggests an arrangement for the addition of identification information in facsimile apparatus, wherein an area of interest for addition of information is identified by fast and slow scan address counters, which measure the position of information from the scanning device on a sheet, and upon reaching an area of interest for the substitution of information, discards information from the scanning device, and substitutes new information.

Of collateral interest are US-A 4,575,717 to Fedele relating to supplying an increased amount of pixel information in a video arrangement; US-A 4,447,809 to Kodama et al. suggesting storage of predetermined information in addresses corresponding to the picture elements in a video system where edges are present, including a counter which determines which address is read; US-A 3,925,776 and US-A 3,944,997, both to Swallow, relating to a video system receiving image generator edges for storage in an edge memory, which are decoded into scan line segments, defined partially by position (x, y) coordinates on a screen display; US-A 4,580,158 to Macheboeuf suggests a video signal combining system for combining predetermined portions of a pair of video signals representing different portions of a final image; US-A 4,613,906 to Tanaka which suggests a video picture combining apparatus using first background image and a second superimposed image to produce a combined output image. US-A 3,911,418 to Takeda shows a video system combining a foreground character display with background colors; and US-A 4,646,250 to Childress suggests highlighting a portion of an interactive video display for the purpose of prompting responses. The comparison of video (television) information to image scanning, as for example, facsimile, is difficult, because of the speed and quantity differences in which information is handled. A result is that microprocessors can generally only be used to set up the image processing operations, as opposed to perform them, because they cannot economically approach the speeds of data handling required.

The following are incorporated by reference as illustrative of the state of the art in image manipulation: US-A 4,442,544 to Moreland et al, showing an adaptive thresholding technique; US-A 4,194,221 describing detection of data format, and processing to accommodate the format for optimum handling; US-A 4,275,450 to Potter, describing magnification and reduction apparatus; US-A 4,674,040 to Barker et al. showing merging a portion of one document into another; US-A 4,667,248 to Kanno describing electronic paste-up of images; US-A 4,302,782 to Gunning et al. describing electronic precollation and image centering and edge fadeout; Xerox Disclosure Journal, Volume 9, No. 1, January/February 1984, Implementation Technique for Magnification, Reduction, and Windowing of Electronic Images; Xerox Disclosure Journal, Volume 7, No. 3, May/June, 1982, Window/Image Cropping; Xerox Disclosure Journal Volume 7, No. 1, January/February 1982, Automatic Gain Control for Image Input Module describing pixel correction; Xerox Disclosure Journal, Volume 5, No. 6, November/December, 1980, Image Scaling Using Bit Throw-Away Memory; and Fundamentals of Digital Copiers, Revision 1, Publication No. FY8-1339010, Canon Inc., October 1984, describing thresholding, screening black/white inversion, framing, blanking, image rotation.

SUMMARY OF THE INVENTION

In accordance with the invention there is provided a method and apparatus for processing image information, applying to each pixel or image data byte in a scan line of image information an address designation or token describing its position in the scan line. By providing each data byte of image information with an address token defining its specific position in the scan line, as image information is initially entering the image processing section of an image processing device, the image information for a pixel of the image is specifically located in the image configuration, without requiring re-storage of the entire image for manipulation. Operation on both data and address locations become possible. One embodiment of the invention provides an image data input receiving image data and providing an array of scan lines of image data bytes for processing; data byte addressing means for generating a digitally encoded address token for each image data byte in a scan line, for combination with the image data byte to form an addressed image data byte defining a final image address and image data, such as, for example, a counter driven by a device clock which can provide successive address values for combination with the image data bytes.

An image processing device assigning each data byte with an address token allows particularly advantageous image information manipulation. Image overlay, i.e., superimposing additional image information over an original image, becomes a logical operation in an area of interest, which may be applied without recalculating the position of the area of interest. Thus, for the addition of image information to an original image, a video manipulation device designates an area defined by address, and upon detecting that address, as determined by the pre-assigned address token, uses simple logical operations and devices to combine image information into the desired output image, with the address token now defining the position of the manipulated image information in the final output.

In accordance with another aspect of the invention, address manipulation means arithmetically and logically manipulate address portions or tokens of addressed image data bytes at addresses of interest for image manipulation. Thus, the image information on a data byte may be re-addressed and moved to a new position in the final output. Combined image information add address manipulation is accomplished by manipulation of both values.

These and other aspects of the invention will become apparent from the following description used to illustrate a preferred embodiment of the invention read in conjunction with the accompanying drawings in which:

FIG. 1 demonstrates a block diagram of an image information processing system wherein the present invention finds particular use;

Digital image information in the form of image data picture elements, (hereinafter, pixels), digital voltage representations of image intensity at discrete locations in an image, is provided from a suitable source. For example, the image data pixels may be obtained through line by line scanning of an image bearing original by one or more photosensitive imaging devices, such as a multiple element array of charge coupled devices, commonly referred to as CCD's. Line by line scanning of an image bearing original for the derivation of image information is well known and does not form a part of the present invention. Of course, it will no doubt be appreciated that image information may be computer generated, or provided from an electronically stored original. While the present invention finds particular utility with an image scanning device, and will be described with reference thereto, the invention may also find relevant use in a loop back mode, or with a processing system which may or may not include a scanner incorporating the invention.

Figure 1:
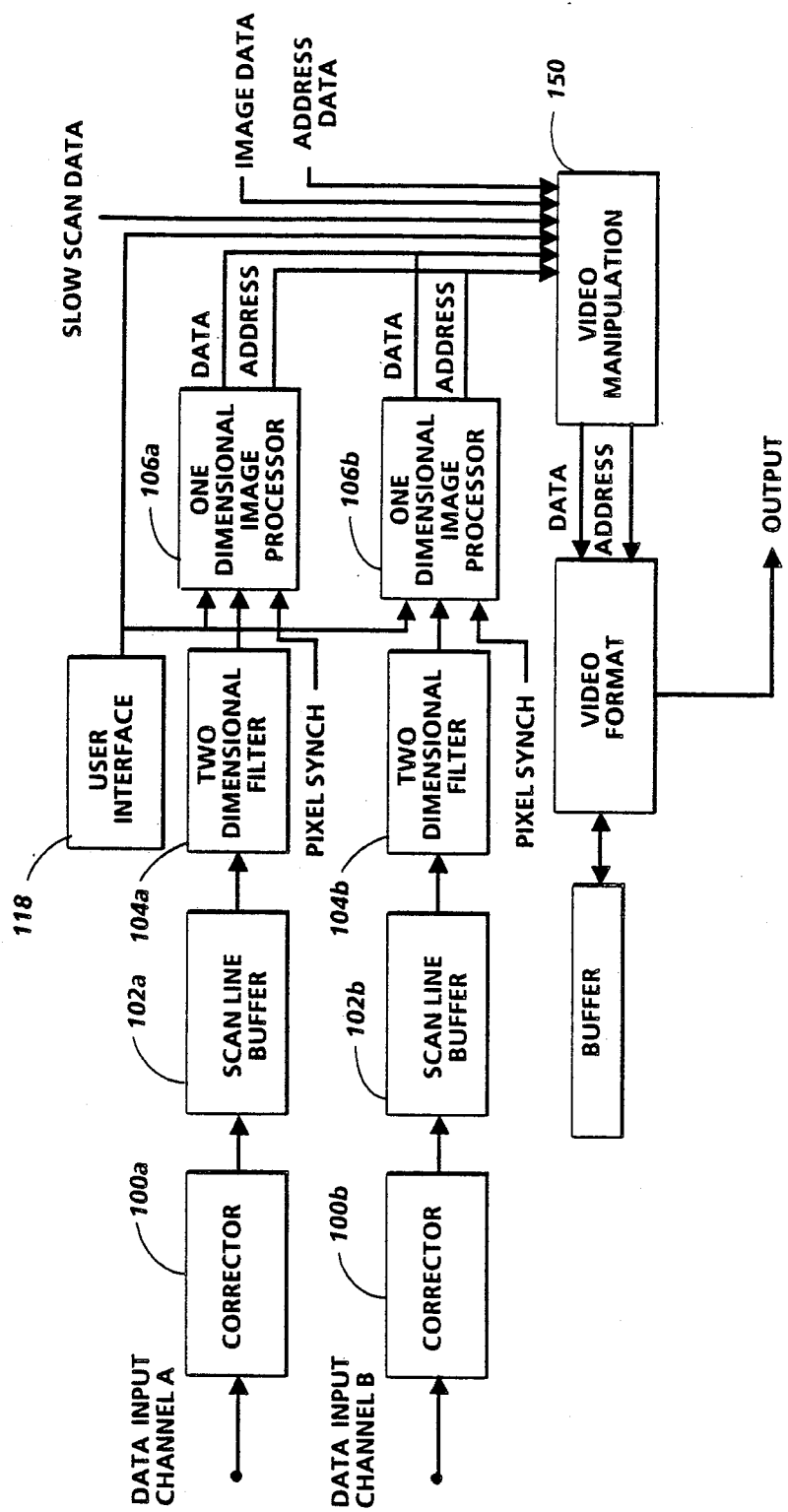

With reference now to the drawings where the showings are for the purpose of illustrating a preferred embodiment of the invention and not for limiting same, in an application incorporating the present invention, FIG. 1 shows an image processing arrangement in accordance with the present invention. In the described embodiment, image information or image data may be initially derived from an imaging device, typically comprising a scanning array of photosensitive elements, such as for example CCD's, which generate analog signals in accordance with exposure to light imagewise reflected from an original document. When image information is produced from a scanning device, it might be produced along several channels, herein exemplified by channels A and B, where each channel represents a portion of the scanning array from which image information is derived, each portion approximately, for example, 2048 pixels long. Providing plural channels will allow parallel and faster processing of the image information. In a high density scanning array, which may have a length corresponding to the full width of a document to be scanned, several channels may be present, but for the purpose of explaining the present invention, only two channels will be illustrated.

Each channel directs image information, assumed to be converted at an analog to digital converter (not shown) functionally adjacent to the scanning array, from the analog signal initially derived from the scanning array to a digital signal, typically an 8 bit data byte, into correctors 100a, 100b. At correctors 100a, 102b, data is normalized against a predetermined calibration to account for discrepancies in the sensitivity of each photosensitive element. The data is also de-skewed to account for the order in which data is derived from each photosensitive element in the scanning array, and correction algorithms account for bad photosensitive element locations in the array by various interpolation and bad pixel discarding routines. Corrected data is stored into scan line buffers 102a, 102b, which store a plurality of scan lines for operation by the two dimensional filters 104a, 104b. Two dimensional filters 104a, 104b detect and convert halftone screened data into grey data for the prevention of more effects. Because filtering routines useful in the conversion require information about the nearest neighbors to any particular pixel, scan line buffers 102a, 102b provide two dimensional filters 104a, 104b with data for groups of adjacent scan lines. It will, of course, be appreciated that while the data line is illustrated as a single line, the 8 bit data byte is transmitted from device to device along 8 parallel data transmission lines.

Figure 2:
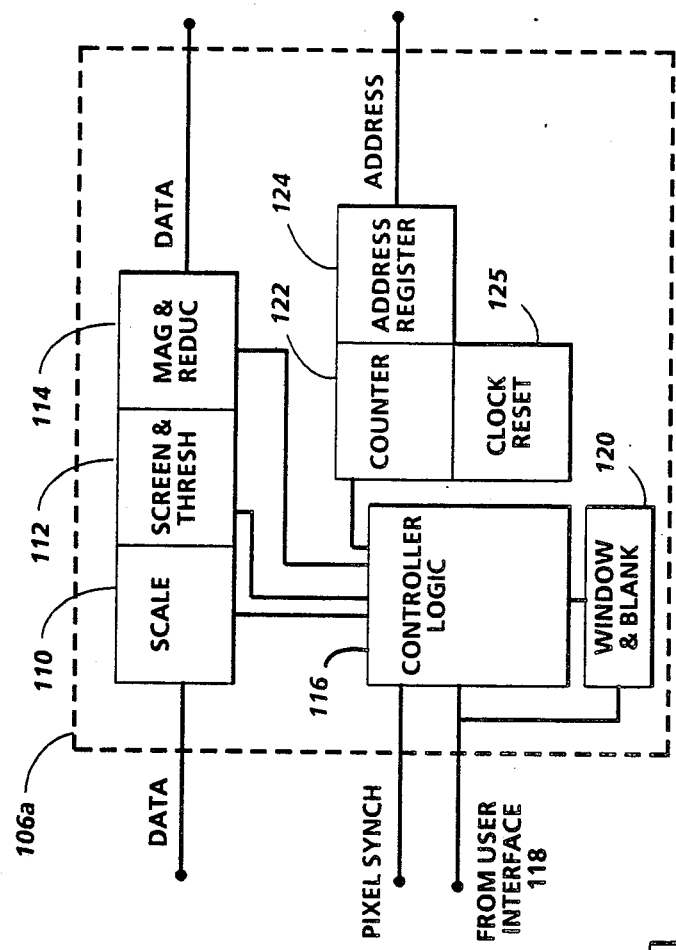
FIG. 2 is a block diagram illustrating the various elements forming the one dimensional image processing device of FIG. 1.
Figure 3:
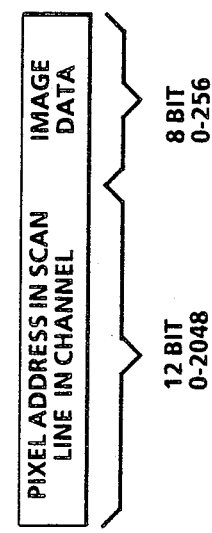
FIG. 3 shows an illustrative addressed data byte.

In accordance with one aspect of the invention, and as shown in FIGS. 1 and 2, one dimensional image processors 106a, 106b (in common referred to as 106) are provided for operation on the data along each scan line. One-dimensional image processors 106a, 106b perform many common operations expected in image processing devices. Each of several processing function circuits, including scaling circuit 110, screening and thresholding circuit 112, and magnification and reduction circuit 114, are enabled by controller logic 116 for operation on data passing through one dimensional image processors 106a, 106b. Controller logic 116 is user controllable through user interface 118, which may be a microprocessor driven device, responsive to operator commands and selection of functions, to cause controller logic to enable processing function circuits 110, 112 and 114. User interface 118 also desirably controls window and blanking circuit 120 to instruct controller logic 116 to allow passage or deletion of data in various selected areas of the image for windowing and blanking applications. In addition to these operations, inventive one-dimensional image processor 106 produces an address for each image data byte in a scan line, as additional data for combination with each image data byte passing therethrough. Counter 122 is driven by controller logic 116 in accordance with a clocking or pixel synch signal input from the scanning device to controller logic 116 to produce a 12 bit address designation or token indicative of the position along the scan line of the image data byte passing through one dimensional image processor 106. Counter 122 incrementally loads latch or address register 124 with an address token for output with the image data byte. Periodically, the counter is reset to indicate a new scan line, by counter reset 125. The result is that each addressed data byte has associated with it an address defining an ultimate location along the scan line, as well as information regarding its intensity. Thus, for example, as shown in FIG. 3, each pixel is defined by a 20 bit value, where 8 bits represent the image data byte intensity, and the remaining 12 bits are the address token. It will of course be appreciated that while the address line is illustrated as a single line, the 12 bit address token is transmitted from device to device along 12 parallel data transmission lines.

Figure 4:
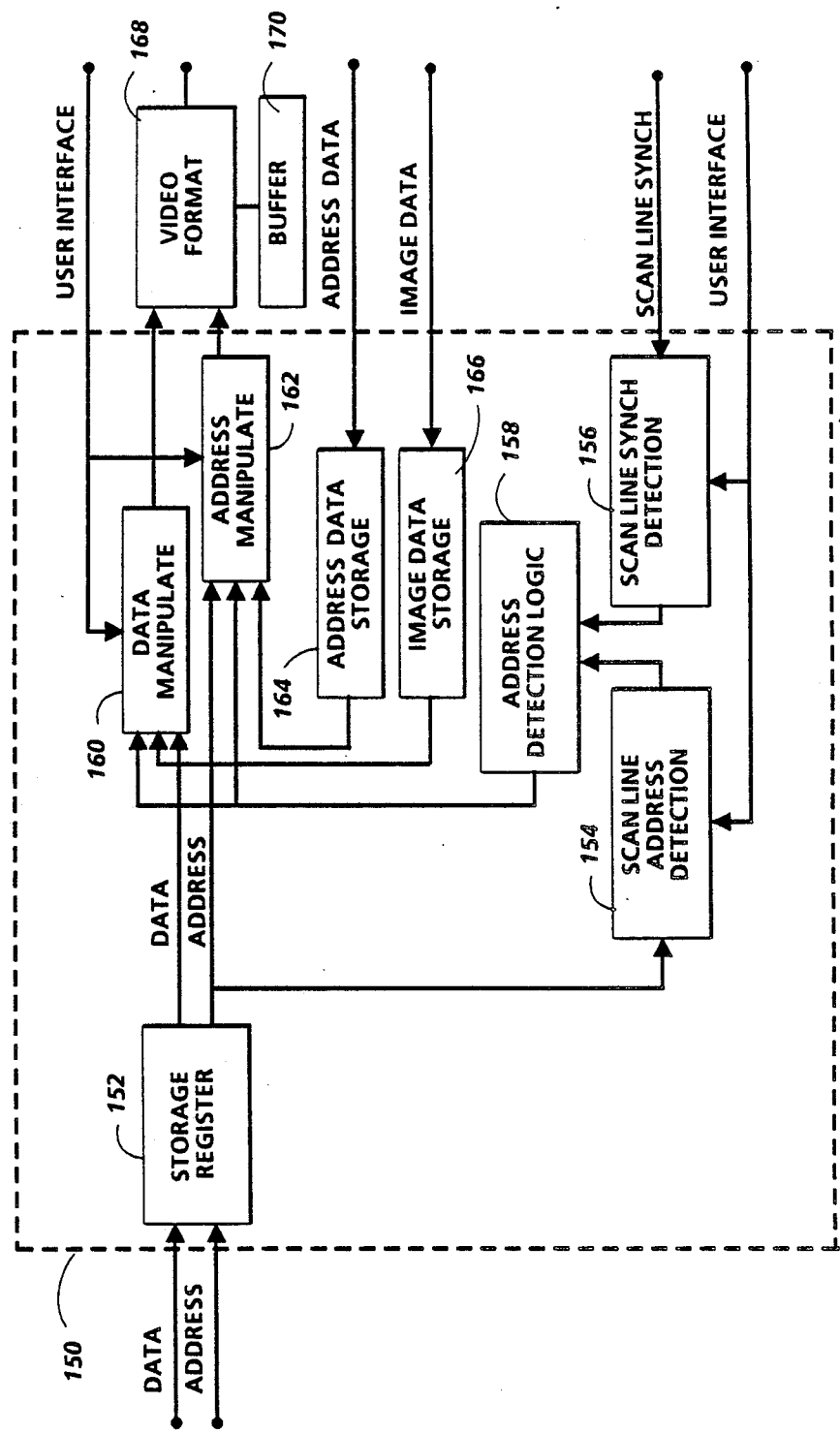
FIG. 4 shows the video manipulation device of FIG. 1 for manipulating data to which address designations have been added.

With reference to FIGS. 1 and 4, each data byte, now position-defined by an address token, is passed to a video manipulation device 150. At this device, image manipulation desired by a user is applied to data. Each data byte is passed to video manipulation device 150 into a latch or storage register 152. The address of the addressed image data byte in storage register 152 is compared to addresses of interest by scan line address detector 154, as received from the user interface 118. Simultaneously, scan line synch detector 156 counts scan line synch signals, signals indicating the presence of a new scan line, for comparison with a synch signal value of interest received from user interface 118, to determine whether the address token appears in a scan line of interest. In combination, the address token and synch signal uniquely define each image data byte on a page of data. It will no doubt be appreciated that while the scan line designation, i.e., the scan line in which the address token appears, has not been combined with the address data byte, it could easily be so combined. However, combination of the scan line address with the addressed data byte would require a large number of pin outs in each component of the image processing device, which has heretofore been uneconomical to manufacture. However, such combination is well within the scope of the present invention.

Upon detection of an address of interest, defined herein as an address that will be subject to data and/or address manipulation, address detection logic 158 produces a signal indicating an address of interest, to drive the data manipulation device 160 in accordance with predetermined function defined at the user interface. Likewise, detection logic 158 produces a signal, to drive the address manipulation device 162. In normal circumstances, without a selected image processing function, addressed data bytes simply pass through the data manipulation device 160 and address manipulation device 162 unchanged.

When an address of interest is indicated to be in storage register 152, data manipulation routines applied at the user interface are set into operation. Additional data required for the operation is temporarily stored at address and image data storage devices 164 and 166, and may be obtained from an exterior source, such as a previously stored scanned image or new computer generated data. Preferably, the new data has been assigned address tokens, although this could be provided in the image processing device.

At data manipulation device 160, several different manipulation operations are possible, which may be provided with hardwired logic, enabled by the user interface. Thus, for example, basic functions could easily provide deletion of image information, merging of image information or substitution of image information. In the case of deletion or substitution of image information, providing an AND function, between the original image data bytes and stored value of "0" causes deletion of image information, and a black level response in most output devices. Likewise, a NAND gate between the original image data bytes and stored value of "0" would provide deletion of image information and a white level response in the same device. Merging of data may be accomplished by an OR gate between the original data bytes and stored value of new data. Substitution may be accomplished by a combination of deletion and subsequent merging of data. Other data editing functions, are selectable for addition and enablement in the data manipulation device. It will no doubt be appreciated that a series of separate data manipulation devices could be provided for a large number of functions.

At address manipulation device 162 several different address manipulation operations are possible, which may be provided with hardwired logic, enabled by the user interface. Thus, for example, address variations are possible for a variety of functions. Address data stored in address data storage device 164 may be added or subtracted to the original data bytes to shift the image by selected values across the scan line. New addresses may be substituted for original address information to achieve for example mirror imaging, by changing the address of the first addressed image data byte in the scan line to be the last image data byte in the scan line, the second pixel to be the second last, etc.

The image processing functions described with respect to the data and address portions of the imaged address bytes are known to those skilled in the art of image processing, and may be easily incorporated into the address designation scheme described. The novel addition of address tokens to the image information however, avoids the requirement of counting pixel positions each time an editing function is enabled and avoids the need to store image data in final configuration during processing, thus allowing real time editing.

Subsequent to image processing, data bytes manipulated in the video manipulation device are transferred to the video format device 168. Video format device 168 combines the addressed data in buffer 170, stitching together the plurality of channels in accordance with their correct position along the scan line, and directing the addressed data bytes to the final address.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. An image processing device for processing image data including:
   image data input for receiving image data and providing a plurality of scan lines of image data bytes for processing;
   data byte addressing means for generating an address token for each image data byte, identifying the position of the image data byte in a scan line, for combination with the image data byte to form an addressed image data byte defining a final image address along a scan line and image data for each data byte;
   control means for selecting image manipulation routines and identifying addresses of interest for image manipulation;
   address manipulation means for selectively arithmetically and logically manipulating address portions of addressed image data bytes at addresses of interest for image manipulation; and
   image data manipulation means for selectively manipulating image data portions of addressed image data bytes at addresses of interest for image manipulation of addressed image data bytes at addresses of interest.

2. The image processing device as defined in claim 1 wherein said data byte addressing means includes an address generating counter, resettable in accordance with detection of a new scan line, to produce address tokens for each data byte along a scan line.

3. The image processing device as defined in claim 1 including:
   means for identifying addresses of interest, in a scan line, at locations for image data manipulation;
   address detecting means for comparing said address tokens of addressed image data bytes with predetermined addresses of interest for each addressed image data byte to identify predetermined addresses of interest along a scan line;
   scan line synchronization detector means for detecting whether the address token occurs in a selected scan line;
   logic means for determining when the combination of address detecting means and scan line synchronization detector means indicate a unique address of interest;
   image data storage means storing image data for combination with image data portions at addresses of interest;
   address data storage means storing address data for combination with original address data portions at addesses of interest;
   storage control means for controlling said image data storage means, for selected combination or substitution of image data from said image data storage means with image data portions of addressed image data bytes in accordance with selected image manipulation routines.

4. An image processing device for processing scan lines of image data, each scan line of image data including an address token identifying the location of an image data byte along the scan line of image data, the image data byte defining image information at the addressed location along the scan line, the image processing means comprising:
   address token detecting means for detecting address tokens of image data bytes for each image data byte in a scan line to identify addesses of interest;
   scan line synchronization detecting means for determining whether the address token occurs in a selected scan line;
   address manipulation means for selectively arithmetically and logically changing the address token of the image data bytes at addresses of interest in selected scan lines in accordance with a desired final position of the image data byte.

5. The image processing device as defined in claim 4 including:
   data manipulation means for controlling selected combination or substitution of image data from an image data source with image data portions at addresses of interest identified by said address detecting means.

6. A method of processing image data including a plurality of image pixels in a scan line, each image pixel defined by an image data byte, comprising the steps of:
   applying an address token to each image data byte in the scan line including a plural bit identification defining the position of the image data byte in the scan line at an output, producing a plural bit data value including an address token and an image data byte;
   selectively identifying an area of interest for image manipulation;
   detecting address token of data values to determine whether the image data byte is positioned in an identified area of interest;
   selectively arithmetically and logically manipulating the address token of the image data byte to define a new position therefor in the scan line; and
   outputting the manipulted image.

7. The method as defined in claim 6 and further including the step of
   selectively manipulating the image data byte in the area of interest to define new image data for the image data byte in the scan line.

8. An image processing device for processing image data, defined by a plurality of image data bytes including:
   means for combining a scan line position address with each image data byte, identifying the position of the data byte along a scan line, to provide an addressed image data byte, to define the position of each data byte in an output;
   means for detecting the position address of each addressed image data byte to determine the address of any selected addressed data byte;
   means for comparing the position address with preselected addresses of interest; and
   means for arithmetically and logically manipulating the addressed image data byte at said preselected addresses of interest to derive a new output, wherein the address portion of said addressed image data byte is manipulated to define a new position for the image data portion in said new output.

9. The image processing device as defined in claim 8, wherein the image data of said addressed image data byte is manipulated to define a new data at the selected address in the new output.

* * * * *